(12) United States Patent
Huang et al.

(10) Patent No.: US 8,548,458 B2
(45) Date of Patent: Oct. 1, 2013

(54) METHOD, DEVICE, AND SYSTEM FOR MEASURING AND REPORTING AUTOMATIC NEIGHBOUR RELATION

(75) Inventors: Ying Huang, Shanghai (CN); Ping Song, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/234,645

(22) Filed: Sep. 16, 2011

(65) Prior Publication Data

US 2012/0009919 A1    Jan. 12, 2012

Related U.S. Application Data

(63) Continuation of application No. PCT/CN2009/070832, filed on Mar. 17, 2009.

(51) Int. Cl.
| | |
|---|---|
| *H04W 24/00* | (2009.01) |
| *H04W 36/00* | (2009.01) |
| *H04W 4/00* | (2009.01) |
| *H04M 1/00* | (2006.01) |
| *H04M 3/00* | (2006.01) |
| *H04L 12/26* | (2006.01) |

(52) U.S. Cl.
USPC ........ 455/423; 455/436; 455/435.1; 455/418; 455/513; 455/525; 370/225; 370/242; 370/331

(58) Field of Classification Search
USPC .......... 455/423, 436, 513, 525, 435.1–435.2; 370/331, 225, 242
See application file for complete search history.

(56) References Cited

U.S. PATENT DOCUMENTS

| 7,386,606 B2 | 6/2008 | Massoulie et al. |
| 2007/0127398 A1 | 6/2007 | Cai |
| 2007/0248053 A1* | 10/2007 | Dalsgaard ..................... 370/331 |
| 2009/0023448 A1 | 1/2009 | Attar et al. |
| 2009/0061878 A1* | 3/2009 | Fischer .......................... 455/436 |

(Continued)

FOREIGN PATENT DOCUMENTS

| CN | 1859752 | 11/2006 |
| CN | 1984471 | 6/2007 |

(Continued)

OTHER PUBLICATIONS

International Search Report from P.R. China in International Application No. PCT/CN2009/070832, mailed Dec. 24, 2009.

(Continued)

*Primary Examiner* — Vladimir Magloire
*Assistant Examiner* — Michael Mapa
(74) *Attorney, Agent, or Firm* — Slater & Matsil L.L.P.

(57) ABSTRACT

The present invention relates to the communications field and discloses a method, a device, and a system for measuring and reporting an automatic neighbor relation (ANR), which are capable of completing an ANR function during a radio link failure (RLF), therefore saving measurement time and improving network performance. The solution is: when an RLF occurs, receiving a radio resource control (RRC) link reestablishment failure message, where the RRC link reestablishment failure message carries control information instructing a user equipment (UE) to perform an ANR measurement; performing the ANR measurement according to the control information in the RRC link reestablishment failure message to obtain an ANR measurement result; and after receiving an RRC link establishment response message, reporting the ANR measurement result by using an RRC link establishment complete message.

9 Claims, 4 Drawing Sheets

(56) References Cited

U.S. PATENT DOCUMENTS

| | | | | |
|---|---|---|---|---|
| 2010/0003980 A1* | 1/2010 | Rune et al. | .................... | 455/436 |
| 2010/0099402 A1* | 4/2010 | Wu | ............................... | 455/423 |
| 2011/0080825 A1* | 4/2011 | Dimou et al. | .................. | 370/216 |
| 2012/0069732 A1* | 3/2012 | Xu et al. | ........................ | 370/221 |

FOREIGN PATENT DOCUMENTS

| | | |
|---|---|---|
| CN | 101296459 | 10/2008 |
| CN | 101378580 | 3/2009 |
| WO | WO 2008/147267 A1 | 12/2008 |
| WO | WO 2009/026814 A1 | 3/2009 |

OTHER PUBLICATIONS

Written Opinion of the International Search Authority related to International Application No. PCT/CN2009/070832, mailed Dec. 24, 2009, for Huawei Technologies Co., Ltd.

Extended European Search Report mailed Mar. 28, 2012, for European Patent Application No. 09841693.6.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP Standard; 3GPP TS 36.300, 3rd Generation Partnership Project (3GPP), Mobile Competence Centre ; 650, Route Des Lucioles ; F-06921 Sophia-Antipolis Cedex ; France, No. V8.7.0, Dec. 1, 2008, pp. 1-144.

"3rd Generation Partnership Project; Technical Specification Group Radio Access Network; Evolved Universal Terrestrial Radio Access (E-UTRA) Radio Resource Control (RRC); Protocol specification (Release 8)", 3GPP Standard; 3GPP TS 36.331, 3rd Generation Partnership Project (3GPP), Mobile Competence Centre ; 650, Route Des Lucioles ; F-06921 Sophia-Antipolis Cedex ; France, No. V8.4.0, Dec. 1, 2008, pp. 1-198.

* cited by examiner

METHOD, DEVICE, AND SYSTEM FOR MEASURING AND REPORTING AUTOMATIC NEIGHBOUR RELATION

CROSS-REFERENCE TO RELATED APPLICATIONS

This application is a continuation of international application No. PCT/CN2009/070832, filed on Mar. 17, 2009, which is hereby incorporated by reference in their entireties.

FIELD OF THE INVENTION

The present invention relates to the communications field, and in particular, to a method, a device, and a system for measuring and reporting an automatic neighbour relation (ANR).

BACKGROUND OF THE INVENTION

In order to achieve objectives such as handover, exchange of information between evolved NodeBs (eNBs), and management, a system needs to configure a neighbouring cell list for each cell, but in a configured neighbouring cell list, a neighbouring cell may be missing.

A neighbouring cell is missing for many reasons: Some are predictable, for example, a new cell is added, or the original frequency, scrambling code, or any other attribute of a cell changes but a neighbouring cell relation of the cell is not updated in time; some are beyond control of an operator, for example, dismantling a building results in a new change of signal coverage of a cell, but the neighbouring cell relation of the cell is not updated in time; and some are missing because network planning personnel fail to correctly configure the neighbouring cell relation of a cell, and so on. The missing configuration of a neighbouring cell may cause a user equipment (UE) to fail to hand over to another cell in time, which overloads the current cell, degrades signal quality and increases interference of the current cell, or results in a call drop of a user.

Previously, after detecting a new cell, an operator and network planning personnel decide, according to a certain strategy, whether or not to manually add a neighbouring cell relation for the current cell.

A long term evolution (LTE) system adds a neighbouring cell list by using an ANR function.

The ANR function includes: A UE assists in measuring a new cell and reports measured information to an eNB, and the eNB implements a function of adding a neighbouring cell list, so that a neighbouring cell is automatically added by the system and does not need to be manually added.

Currently, a measurement and reporting process performed by a UE in the ANR is: The UE reports to an eNB a measured physical cell identifier (PCI) of a cell around, and the eNB checks cell information relating to the PCI. If the PCI is a new PCI, the eNB considers that a new cell is found. If the eNB decides to add this new cell (of course, the eNB may also decide not to add this new cell), the eNB notifies the UE again to further measure a cell global ID (CGI). If the UE completes the measurement, the UE reports some relevant information of the cell such as the CGI to the eNB.

At some cell edges, when a radio link failure (RLF) occurs suddenly, the UE reselects a cell and sends a radio resource control (RRC) reestablishment request to the new cell. If there is no UE context in the new cell, the eNB of the new cell sends an RRC reestablishment failure message to the UE, and the UE goes into an idle state. In order to keep a service uninterrupted, the UE may trigger an RRC link establishment process or trigger a tracking area update (TAU) process by a non access stratum (NAS).

In the process of implementing the present invention, the inventor discovers that the prior art has at least the following problems:

When an RLF occurs, the ANR function cannot be completed, and instead, a separate ANR measurement is required, which wastes measurement time and affects network performance.

SUMMARY OF THE INVENTION

An embodiment of the present invention provides a method, a device, and a system for measuring and reporting an ANR, which are capable of completing the measurement and reporting of the ANR when an RLF occurs, therefore saving measurement time and improving network performance.

In order to achieve the preceding objective, embodiments of the present invention employ the following technical solutions:

A method for measuring and reporting an ANR, when an RLF occurs, includes: receiving an RRC reestablishment failure message, where the RRC reestablishment failure message carries control information instructing a UE to perform an ANR measurement.

The method for measuring and reporting an ANR according to the embodiment of the present invention is capable of receiving an RRC reestablishment failure message, where the RRC reestablishment failure message carries control information instructing a UE to perform an ANR measurement when an RLF occurs, so that the ANR can be measured and reported, therefore saving measurement time and improving network performance. It is a supplement to the existing ANR measurement and reporting. Furthermore, the measurement performed by the UE does not affect a service, and no additional process is involved.

A UE includes a receiving unit, configured to receive an RRC reestablishment failure message, where the RRC reestablishment failure message carries control information instructing the UE to perform an ANR measurement.

The UE according to the embodiment of the present invention is capable of receiving an RRC reestablishment failure message, where the RRC reestablishment failure message carries control information instructing the UE to perform an ANR measurement when an RLF occurs, so that the ANR can be measured and reported, therefore saving measurement time and improving network performance. It is a supplement to the existing ANR measurement and reporting. Furthermore, the measurement performed by the UE does not affect a service, and no additional process is involved.

A method for measuring and reporting an ANR, when an RLF occurs, includes: sending an RRC reestablishment failure message, where the RRC reestablishment failure message carries control information instructing a UE to perform an ANR measurement.

The method for measuring and reporting an ANR according to the embodiment of the present invention is capable of sending an RRC reestablishment failure message, where the RRC reestablishment failure message carries control information instructing a UE to perform an ANR measurement when an RLF occurs, so that the ANR can be measured and reported, therefore saving measurement time and improving network performance. It is a supplement to the existing ANR measurement and reporting.

A network device includes: a sending unit, configured to send an RRC reestablishment failure message, where the RRC reestablishment failure message carries control information instructing a UE to perform an ANR measurement.

The network device according to the embodiment of the present invention is capable of sending an RRC reestablishment failure message, where the RRC reestablishment failure message carries control information instructing a UE to perform an ANR measurement when an RLF occurs, so that the ANR can be measured and reported, therefore saving measurement time and improving network performance. It is a supplement to the existing ANR measurement and reporting.

A method for measuring and reporting an ANR, when an RLF occurs, includes: sending an RRC link reestablishment request message, where the RRC link reestablishment request message carries a measured ANR measurement result.

The method for measuring and reporting an ANR according to the embodiment of the present invention is capable of reporting the measured ANR measurement result of an old cell when an RLF occurs, therefore saving time and improving network performance. It is a supplement to the existing ANR measurement and reporting and does not involve any additional process.

A method for measuring and reporting an ANR, when an RLF occurs, includes: receiving an RRC link reestablishment request message, where the RRC link reestablishment request message carries a measured ANR measurement result.

The method for measuring and reporting an ANR according to the embodiment of the present invention is capable of receiving the measured ANR measurement result of an old cell when an RLF occurs, therefore saving time and improving network performance. It is a supplement to the existing ANR measurement and reporting and does not involve any additional process.

A communications system includes:

a network device, configured to send an RRC reestablishment failure message, where the RRC reestablishment, failure message carries control information instructing a UE to perform an ANR measurement; and the UE, configured to receive the RRC reestablishment failure message, where the RRC reestablishment failure message carries the control information instructing the UE to perform an ANR measurement.

In the communications system according to the embodiment of the present invention, when an RLF occurs, the network device sends an RRC reestablishment failure message, where the RRC reestablishment failure message carries control information instructing the UE to perform an ANR measurement, and the UE receives the message, so that the UE can measure and report the ANR, therefore saving measurement time and improving network performance. It is a supplement to the existing ANR measurement and reporting. Furthermore, the measurement performed by the UE does not affect a service, and no additional process is involved.

DETAILED DESCRIPTION OF THE EMBODIMENTS

Embodiments of the present invention provide a method, a device, and a system for measuring and reporting an ANR, which are capable of completing an ANR function during an RLF, therefore saving measurement time and improving network performance.

The following describes the embodiments of the present invention in detail with reference to the accompanying drawings.

A method for measuring and reporting an ANR according to an embodiment of the present invention, when an RLF occurs, includes the following steps:

S101. Receive an RRC link reestablishment failure message, where the RRC link reestablishment failure message carries control information instructing a UE to perform an ANR measurement.

The method for measuring and reporting an ANR according to the embodiment of the present invention is capable of receiving an RRC link reestablishment failure message, where the RRC link reestablishment failure message carries control information instructing a UE to perform an ANR measurement when an RLF occurs, so that the ANR can be measured and reported, therefore saving measurement time and improving network performance. It is a supplement to the existing ANR measurement and reporting. Furthermore, the measurement performed by the UE does not affect a service, and no additional process is involved.

Figure 1:
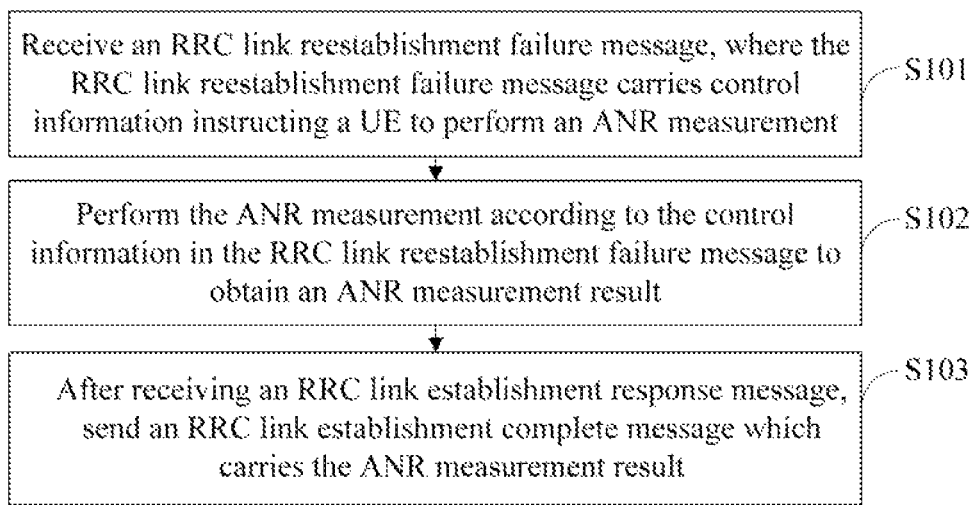
FIG. 1 is a first flowchart of a method for measuring and reporting an ANR according to an embodiment of the present invention.

Further, after step S101, the method includes the following steps, as shown in FIG. 1:

S102. Perform the ANR measurement according to the control information in the RRC link reestablishment failure message to obtain an ANR measurement result.

S103. Send an RRC link establishment request message, and after receiving an RRC link establishment response message, report the ANR measurement result by using an RRC link establishment complete message.

The method for measuring and reporting an ANR according to the embodiment of the present invention is capable of receiving an RRC link reestablishment failure message, where the RRC link reestablishment failure message carries control information instructing a UE to perform an ANR measurement when an RLF occurs, so that the ANR can be measured and reported, therefore saving measurement time and improving network performance. It is a supplement to the existing ANR measurement and reporting. Furthermore, the measurement performed by the UE does not affect a service, and no additional process is involved.

A method for measuring and reporting an ANR according to another embodiment of the present invention, when an RLF occurs, includes the following steps:

S201. Send an RRC link reestablishment failure message, where the RRC link reestablishment failure message carries control information instructing a UE to perform an ANR measurement.

Figure 2:
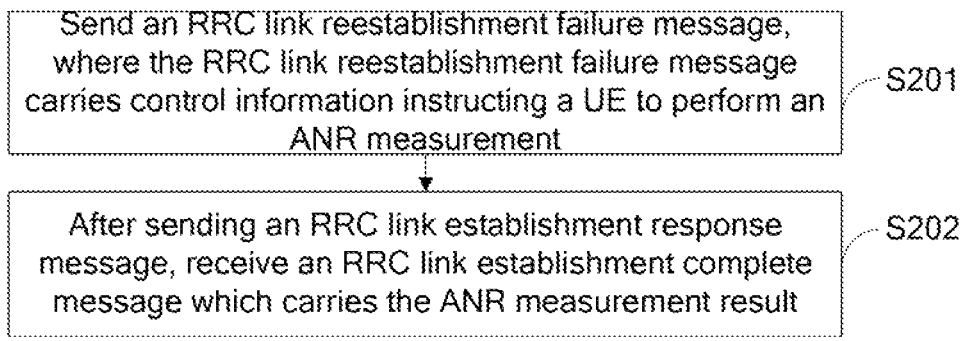
FIG. 2 is a second flowchart of a method for measuring and reporting an ANR according to an embodiment of the present invention.

Further, after step S201, the method may include the following step, as shown in FIG. 2:

S202. Receive an RRC link establishment request message, and after sending an RRC link establishment response message, receive an RRC link establishment complete message, where the RRC link establishment complete message carries an ANR measurement result.

The method for measuring and reporting an ANR according to the embodiment of the present invention is capable of sending an RRC link reestablishment failure message, where the RRC link reestablishment failure message carries control information instructing a UE to perform an ANR measurement when an RLF occurs, and after the UE performs the ANR measurement and reporting, capable of receiving an RRC link establishment complete message, where the RRC link establishment complete message carries the ANR measurement result, therefore saving measurement time and improving network performance. It is a supplement to the existing ANR measurement and reporting. Furthermore, the measurement performed by the UE does not affect a service, and no additional process is involved.

Embodiment 1

Figure 3:
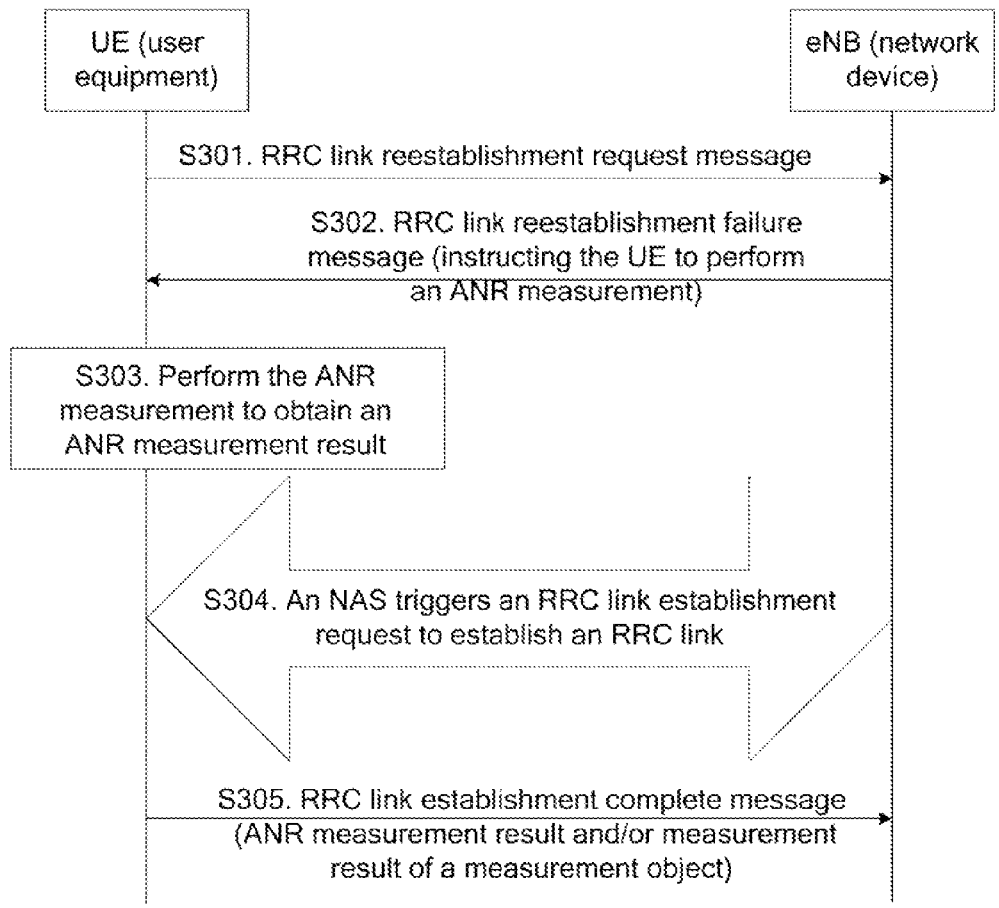
FIG. 3 is a schematic flowchart of a method for measuring and reporting an ANR according to a first embodiment of the present invention.

A method for measuring and reporting an ANR according to a first embodiment of the present invention, when an RLF occurs, includes the following steps, as shown in FIG. 3:

S301. A UE finds a new cell and sends an RRC link reestablishment request message to an eNB (a network device) of the new cell.

S302. The eNB of the new cell sends to the UE an RRC link reestablishment failure message, where the RRC link reestablishment failure message carries control information instructing the UE to perform an ANR measurement.

S303. The UE receives the RRC link reestablishment failure message, and according to the control information in the RRC link reestablishment failure message, performs an ANR measurement to obtain an ANR measurement result. Optionally, a timer may be started when the RRC link reestablishment failure message is received.

S304. An NAS triggers an RRC link establishment request, the UE sends the RRC link establishment request to the eNB, and the eNB agrees to establish an RRC link.

Here, the ANR measurement performed by the UE in step S303 may be simultaneously performed with step S304, and the two steps do not affect each other.

S305. After receiving an RRC link establishment response message, the UE sends to the eNB an RRC link establishment complete message, where the RRC link establishment complete message carries the ANR measurement result and/or a measurement result of a measurement object.

Here, the measurement result of the measurement object includes any one or more of the following: received signal code power (RSCP), reference signal received power (RSRP) and a reference signal strength indicator (RSSI); and the ANR measurement result includes any one or more of the following: a CGI, a frequency, a public land mobile network identity (PLMN ID), an IP address, and so on.

In this embodiment, if the ANR measurement performed by the UE is not completed or the timer times out, the RRC link establishment complete message does not carry the ANR measurement result.

The method for measuring and reporting an ANR according to the first embodiment of the present invention is capable of measuring and reporting an ANR when an RLF occurs, therefore saving measurement time and improving network performance. It is a supplement to the existing ANR measurement and reporting. Furthermore, the measurement performed by the UE does not affect a service, and no additional process is involved.

Figure 4:
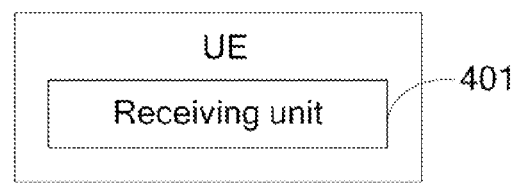
FIG. 4 is a first block diagram of a structure of a UE according to an embodiment of the present invention.

A UE according to an embodiment of the present invention, as shown in FIG. 4, includes:

a receiving unit 401, configured to receive an RRC link reestablishment failure message, where the RRC link reestablishment failure message carries control information instructing the UE to perform an ANR measurement.

The UE according to the embodiment of the present invention is capable of receiving an RRC link reestablishment failure message, where the RRC link reestablishment failure message carries control information instructing the UE to perform an ANR measurement when an RLF occurs, so that the ANR can be measured and reported, therefore saving measurement time and improving network performance. It is a supplement to the existing ANR measurement and reporting. Furthermore, the measurement performed by the UE does not affect a service, and no additional process is involved.

Figure 5:
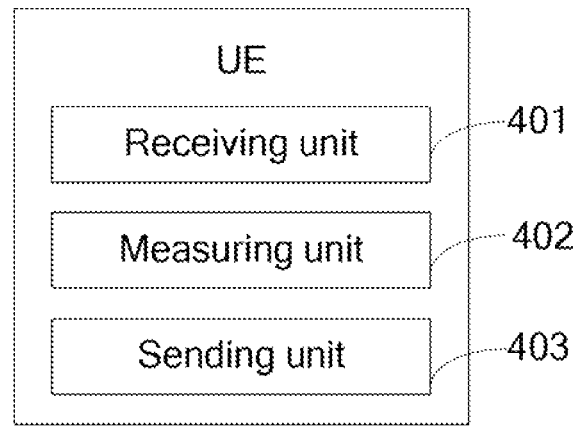
FIG. 5 is a second block diagram of a structure of a UE according to an embodiment of the present invention.

Further, in another embodiment of the present invention, as shown in FIG. 5, the UE also includes:

a measuring unit 402, configured to perform an ANR measurement according to the control information in the RRC link reestablishment failure message to obtain an ANR measurement result; and a sending unit 403, configured to send an RRC link establishment complete message, where the RRC link establishment complete message carries the ANR measurement result.

The UE according to the embodiment of the present invention is capable of measuring and reporting an ANR when an RLF occurs, therefore saving measurement time and improving network performance. It is a supplement to the existing ANR measurement and reporting. Furthermore, the measurement performed by the UE does not affect a service, and no additional process is involved.

Figure 6:
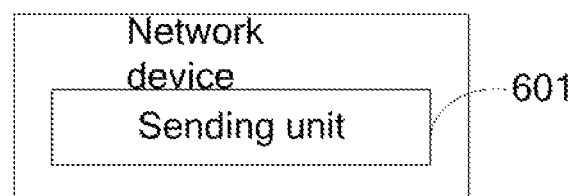
FIG. 6 is a first block diagram of a structure of a network device according to an embodiment of the present invention.

A network device according to an embodiment of the present invention, as shown in FIG. 6, includes:

a sending unit 601, configured to send an RRC link reestablishment failure message, where the RRC link reestablishment failure message carries control information instructing a UE to perform an ANR measurement.

The network device according to the embodiment of the present invention is capable of sending an RRC link reestablishment failure message, where the RRC link reestablishment failure message carries control information instructing a UE to perform an ANR measurement when an RLF occurs, so that the UE can measure and report the ANR, therefore saving measurement time and improving network performance. It is a supplement to the existing ANR measurement and reporting.

Figure 7:
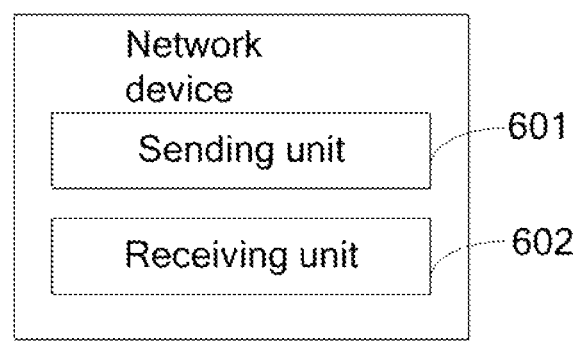
FIG. 7 is a second block diagram of a structure of a network device according to an embodiment of the present invention.

Further, in another embodiment of the present invention, as shown in FIG. 7, the network device also includes:

a receiving unit 602, configured to receive an RRC link establishment complete message, where the RRC link establishment complete message carries an ANR measurement result.

The network device according to the embodiment of the present invention is capable of receiving an ANR measurement result when an RLF occurs, therefore saving measurement time and improving network performance. It is a supplement to the existing ANR measurement and reporting and does not involve any additional process.

A method for measuring and reporting an ANR according to still another embodiment of the present invention, when an RLF occurs, includes:

sending an RRC link reestablishment request message, where the RRC link reestablishment request message carries a measured ANR measurement result.

The method for measuring and reporting an ANR according to the embodiment of the present invention is capable of reporting the measured ANR measurement result of an old cell when an RLF occurs, so that a new cell may directly use the ANR measurement result, therefore saving time and improving network performance. It is a supplement to the existing ANR measurement and reporting and does not involve any additional process.

A method for measuring and reporting an ANR according to still another embodiment of the present invention, when an RLF occurs, includes:

receiving an RRC link reestablishment request message, where the RRC link reestablishment request message carries a measured ANR measurement result.

The method for measuring and reporting an ANR according to the embodiment of the present invention is capable of receiving the measured ANR measurement result of an old cell when an RLF occurs, therefore saving time and improving network performance. It is a supplement to the existing ANR measurement and reporting and does not involve any additional process.

Embodiment 2

Figure 8:
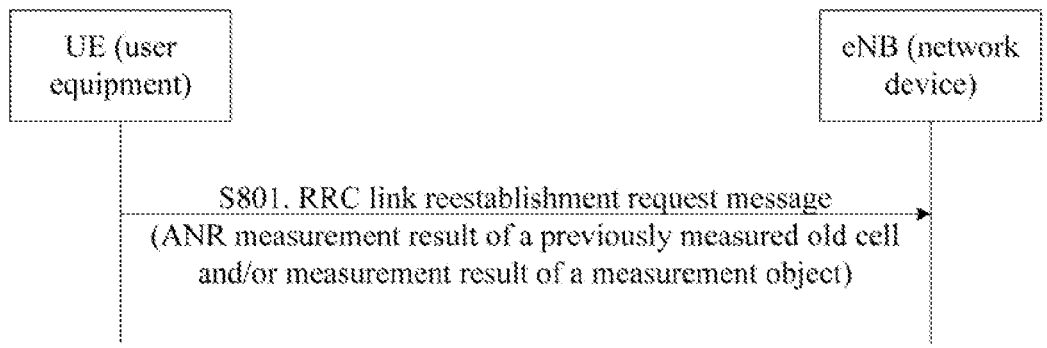
FIG. 8 is a schematic flowchart of a method for measuring and reporting an ANR according to a second embodiment of the present invention.

A method for measuring and reporting an ANR according to a second embodiment of the present invention, when an RLF occurs, includes the following steps, as shown in FIG. 8:

S801. A UE sends an RRC link reestablishment request message to an eNB (a network device), where the RRC link reestablishment request message includes an ANR measurement result of a previously measured old cell and/or a measurement result of a measurement object.

Here, the measurement result of the measurement object includes any one or more of the following: RSCP, RSRP, and an RSSI of a previously measured old cell, and RSCP, RSRP, and an RSSI of a new cell. The ANR measurement result includes any one or more of the following: a CGI, a frequency, a PLMN ID, an IP address, and so on.

The method for measuring and reporting an ANR according to the second embodiment of the present invention is capable of reporting the measured ANR measurement result of an old cell when an RLF occurs, so that a new cell may directly use the ANR measurement result, therefore saving time and improving network performance. It is a supplement to the existing ANR measurement and reporting and does not involve any additional process.

Figure 9:
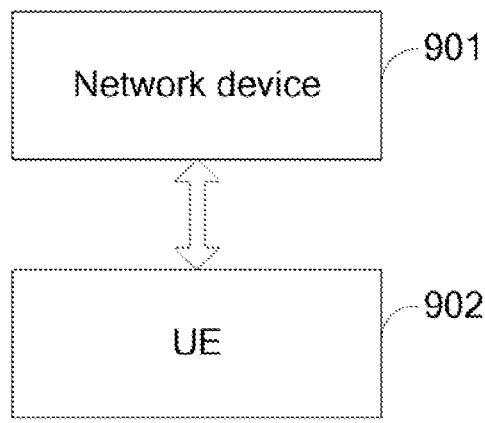
FIG. 9 is a block diagram of a structure of a communications system according to an embodiment of the present invention.

A communications system according to an embodiment of the present invention, as shown in FIG. 9, includes:

a network device 901, configured to send an RRC link reestablishment failure message, where the RRC link reestablishment failure message carries control information instructing a UE 902 to perform an ANR measurement; and the UE 902, configured to receive the RRC link reestablishment failure message, where the RRC link reestablishment failure message carries the control information instructing the UE 902 to perform an ANR measurement.

In addition, the network device 901 is also configured to receive an RRC link establishment complete message, where the RRC link establishment complete message carries an ANR measurement result; or to receive an RRC link reestablishment request message, where the RRC link reestablishment request message carries a measured ANR measurement result.

The UE 902 is also configured to perform an ANR measurement according to the control information in the RRC link reestablishment failure message to obtain the ANR measurement result; to send an RRC link establishment request message and after receiving an RRC link establishment response message, to send the RRC link establishment complete message, where the RRC link establishment complete message carries the ANR measurement result. Alternatively, the UE 902 is configured to send an RRC link reestablishment request message, where the RRC link reestablishment request message carries the measured ANR measurement result.

Here, the structures of the network device 901 and the UE 902 are the same as those of the network device and the UE in the embodiments shown in FIG. 4 to FIG. 7, and therefore are not described here.

The communications system according to the embodiment of the present invention is capable of measuring and reporting an ANR when an RLF occurs, therefore saving measurement time and improving network performance. It is a supplement to the existing ANR measurement and reporting. Furthermore, the measurement performed by the UE does not affect a service, and no additional process is involved.

Detailed above are only exemplary embodiments of the present invention, but the protection scope of the present invention is not limited thereto. Any modification or substitution readily conceivable by those skilled in the art within the scope of technical disclosures of the present invention shall be covered within the protection scope of the present invention. Therefore, the protection scope of the present invention is subject to the appended claims.

What is claimed is:

1. A method for measuring and reporting an automatic neighbour relation (ANR), wherein when a radio link failure (RLF) occurs, the method comprises: receiving a radio resource control (RRC) link reestablishment failure message, by a user equipment (UE), wherein the RRC link reestablishment failure message carries control information instructing the UE to perform an ANR measurement; performing, by the UE, an ANR measurement, to obtain an ANR measurement result, upon receiving the control information carried in the RRC link reestablishment failure message; receiving an RRC link establishment response message; and sending an RRC link establishment complete message, by the UE, carrying the ANR measurement result, wherein: when the RRC link reestablishment failure message is received, a timer is started; and before the timer times out, the sent RRC link establishment complete message carries the ANR measurement result.

2. The method for measuring and reporting an ANR according to claim 1, wherein after the receiving the RRC link reestablishment failure message, the method further comprises:
sending, by the UE, an RRC link establishment request message.

3. The method for measuring and reporting an ANR according to claim 2, wherein the RRC link establishment request message is triggered by a non access stratum (NAS).

4. The method for measuring and reporting an ANR according to claim 1, wherein the RRC link establishment complete message further comprises:
a measurement result of a measurement object, wherein the measurement result of the measurement object comprises any one or more of the following: received signal code power (RSCP), reference signal received power (RSRP), and a reference signal strength indicator (RSSI).

5. A user equipment (UE), comprising: a receiving unit, configured to receive a radio resource control (RRC) link reestablishment failure message, wherein the RRC link reestablishment failure message carries control information instructing the UE to perform an automatic neighbour relation (ANR) measurement; a measuring unit, configured to perform an ANR measurement to obtain an ANR measurement result upon the receiving unit receiving the control information carried in the RRC link reestablishment failure message; and a sending unit, configured to send an RRC link establishment complete message carrying the ANR measurement result, wherein: when the RRC link reestablishment failure message is received, a timer is started; and before the timer times out, the sent RRC link establishment complete message carries the ANR measurement result.

6. A method for measuring and reporting an automatic neighbour relation (ANR), wherein when a radio link failure (RLF) occurs, the method comprises: sending a radio resource control (RRC) link reestablishment failure message, by a network device, wherein the RRC link reestablishment failure message carries control information instructing a user equipment (UE) to perform an ANR measurement upon the UE receiving the control information carried in the RRC link reestablishment failure message; and receiving an RRC link establishment complete message by the network device, carrying the ANR measurement result, wherein: when the RRC link reestablishment failure message is received, a timer is started; and before the timer times out, the sent RRC link establishment complete message carries the ANR measurement result.

7. The method for measuring and reporting an ANR according to claim 6, wherein after the sending the RRC link reestablishment failure message, the method further comprises:
receiving an RRC link establishment request message by the network device; and sending an RRC link establishment response message by the network device.

8. The method for measuring and reporting an ANR according to claim 7, wherein the RRC link establishment request message is triggered by a non access stratum (NAS).

9. The method for measuring and reporting an ANR according to claim 6, wherein the RRC link establishment complete message further comprises:
a measurement result of a measurement object, wherein the measurement result of the measurement object comprises any one or more of the following: received signal code power (RSCP), reference signal received power (RSRP), and a reference signal strength indicator (RSSI).

* * * * *